Figure 1:
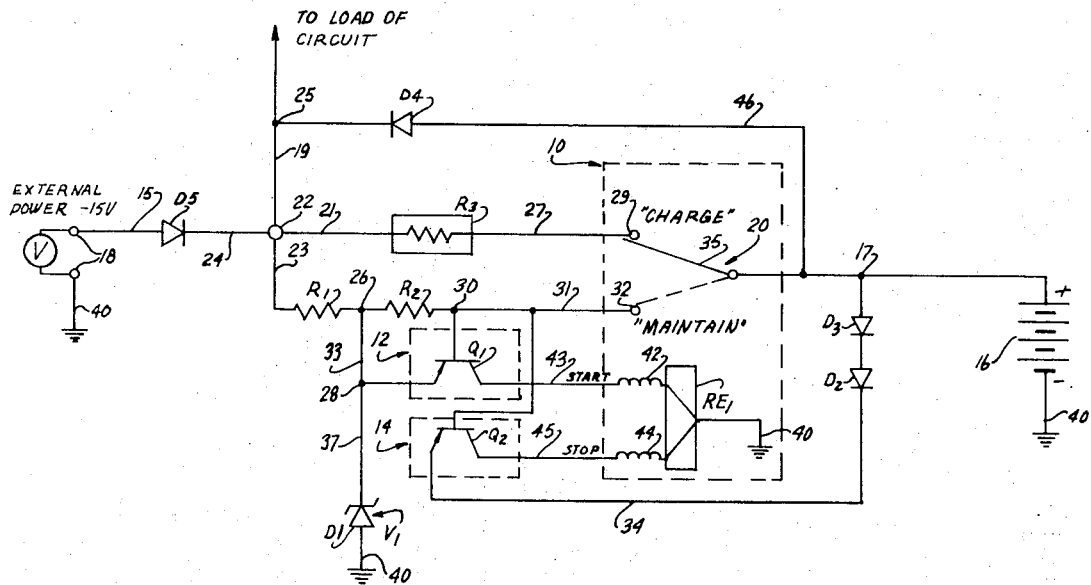

United States Patent [19]
Teich

[11] 3,728,608
[45] Apr. 17, 1973

[54] BATTERY CHARGING CIRCUIT WITH TWO CHARGING SOURCES OF DIFFERENT VOLTAGE

[76] Inventor: Rudor M. Teich, 6040 Boulevard E., West New York, N.J. 07093

[22] Filed: Feb. 9, 1970

[21] Appl. No.: 9,886

[52] U.S. Cl. ................. 320/23, 320/39, 317/155.5
[51] Int. Cl. ............................................. H02j 7/04
[58] Field of Search .................. 320/20, 22, 23, 27, 320/28, 39, 40, 56, DIG. 1; 307/66; 317/150, 155.5

[56] References Cited

UNITED STATES PATENTS

| | | | |
|---|---|---|---|
| 3,389,324 | 6/1968 | Ballman | 320/DIG. 1 |
| 3,426,263 | 2/1969 | Hennigan et al. | 320/40 X |
| 2,716,706 | 8/1955 | Palmer | 320/5 X |
| 2,967,988 | 1/1961 | Seright | 320/36 |
| 3,242,411 | 3/1966 | Lilienfeld | 320/43 |
| 3,267,288 | 8/1966 | Maiden et al. | 320/DIG. 2 |
| 3,417,298 | 12/1968 | Dryden | 317/150 X |
| 3,477,009 | 11/1969 | Nichols | 320/23 |
| 3,491,265 | 1/1970 | Prothero | 317/155.5 X |
| 3,493,837 | 2/1970 | Sparks et al. | 320/40 X |
| 3,517,294 | 6/1970 | Ruben | 320/39 X |
| 3,517,295 | 6/1970 | Lapuyade | 320/23 X |

Primary Examiner—J. D. Miller
Assistant Examiner—Robert J. Hickey
Attorney—James and Franklin

[57] ABSTRACT

A battery charging circuit is provided which automatically charges a battery, maintains a constant voltage across the battery after it is charged and during the period of its non-use, and again charges the battery after a sufficient current drain occurs such as when a load is placed across the battery terminals. The charging circuit includes control means which selects either a main charging source or a reduced voltage charging source according to the condition of the battery, connects the selected source to the battery, and continues the connection of that selected source until the condition of the battery is significantly altered. Circuit sensing means detects the battery condition and actuates the control means to select the proper charging source for connection to the battery.

14 Claims, 2 Drawing Figures

PATENTED APR 17 1973   3,728,608

INVENTOR
RUDOR M. TEICH
BY *James W. Franklin*
ATTORNEY

BATTERY CHARGING CIRCUIT WITH TWO CHARGING SOURCES OF DIFFERENT VOLTAGE

This invention relates to battery charging circuits and specifically to a charging circuit which automatically charges a drained battery by connecting it to the voltage of a main charging source and maintains a reduced charging voltage across the battery terminals after it is charged.

Many electrical systems include a standby power source which is substituted for the main power source when the latter fails to function. Typically, the reserve power source is not connected to the circuitry of the main source and independently generates sufficient power to continue the operation of the system for a brief period. The most common type of such reserve power source, that is, the type which is used in situations directly affecting the public, is an alternating current generator such as is used in hospitals, elevators, subways, etc. There are, however, a large number of applications in which a direct current battery is employed for standby power. The function of the standby battery is the same as that of the AC generator, i.e., to supply power to the main circuit when the primary battery fails. Such failure usually occurs because of the general tendency of batteries to discharge during use.

Certain types of batteries such as the gelatin type leadacid batteries experience a considerable loss of capacity if the terminals are left open circuited when the battery is not in use. This loss of capacity occurs because of the inherent tendency of the battery to self-discharge during this period. Batteries having this characteristic are typical of those generally not suitable for standby use since they are themselves not sufficiently reliable.

Battery charging circuits are usually connected to such standby batteries to restore them to a useable condition after a discharge period occurs either because of use in a circuit or because of extended non-use. Such charging circuits typically include a main charging source which is connected through a resistor to the battery. This charging source has a high nominal voltage relative to that of the battery and supplies a charging current through the resistor. After the battery is charged, a resistor of higher ohmic value is substituted between the charging source and the battery, since the continued application of high voltage through a low resistance would damage the battery. The battery is thus "trickle charged" in these circuits during its period of non-use.

These battery charging circuits are not totally satisfactory for use with standby batteries. They recharge a standby battery to a nominal operating condition only after a predetermined excessively low discharge level is reached. Moreover, they do not satisfactorily maintain the battery in its charged condition by trickle charging during periods of non-use; they tend to overcharge the battery, and this too is harmful to the battery. Furthermore certain batteries such as lead acid type batteries require the addition of water after extended periods of non-use even with a trickle charge during such periods. Therefore, a standby battery is often connected into a circuit when its capacity has been reduced, after a long standby period, to an extent insufficient for it to function properly in the primary circuit.

Accordingly, it is the primary object of this invention to provide a battery charging circuit which is capable of automatically charging a battery to a desired level and maintaining the battery substantially at that charged level during period of non-use.

It is another object of this invention to provide a battery charging circuit for a standby battery which is capable of substantially preventing loss of capacity of the battery during non-use periods without tricle charging the battery and restoring quickly the full charge of the battery after periods of use.

Broadly, the battery charging circuit of the invention comprises a control means which properly selects either a main charging source or a reduced voltage charging source according to the condition of the battery and connects the selected charging voltage to the battery. The selected voltage source is maintained across the battery until the other source is needed, at which time the control means automatically switches to the other source. Sensing means are effective to detect the condition of the battery and to produce an actuating signal in response to the detected condition, that actuating signal being transmitted to the control means to actuate the latter. Thus, if the battery is discharged, this condition is sensed by one sensing means and the control means is actuated to connect the battery to the main charging source. When the charging has been completed, that is, when a predetermined charging level is achieved, this is detected by the sensing means and the control means is then actuated to connect the battery to a reduced voltage charging source of a value sufficient to maintain the battery in a charged condition during a period of non-use. Subsequently if the battery is again discharged connection thereof to the main charging source is once again made automatically by the control means.

As in present battery charging circuits, the main voltage source is at a higher voltage level than the nominal voltage of the battery and is connected to the battery through a current limiting resistor. However, the reduced voltage charging source is at a voltage which is only slightly higher than the battery nominal voltage. Placing this reduced voltage across the battery terminals during periods of battery non-use stabilizes the internal condition of the battery and therefore prevents self-discharge. Moreover, the application of this low voltage to the battery substantially eliminates trickle charge current which occurs when a higher voltage difference between the battery and charging source is maintained such as when the main charging source is connected to the battery. Thus by the use of a separate reduced voltage charging source, standby battery capacity is maintained at a desired level and overcharging is avoided.

In the preferred embodiment the control means comprises a switch such as a magnetic latching relay having a switch energizing means such as an induction coil. In one embodiment there are two induction coils, each connected directly to a sensing means and each effective when actuated to move the relay arm to one position or another. The sensing means preferably comprise semiconductor components such as transistors which detect the voltage level of the battery and which conduct in response to predetermined detected levels. Two such transistors are provided, one to detect the battery level at which connection to the main charging source should begin, and the other to detect the battery voltage level at which that connection should be terminated. When either of these levels is reached, an actuating signal is transmitted from the appropriate transistor to the induction coil connected directly thereto. Since the magnetic latching relay switches from one position to another in response to the current passing through a specific induction coil, and since it is insensitive thereafter to further current flow through that coil (or absence of such flow), the switch will remain in the actuated position until a subsequent current flow is passed through the other of the induction coils. At that point the control switch will then be moved automatically to the other of its positions and will remain at that position until the first coil is again actuated. In a second embodiment a latching relay with a single coil is used, the relay being sensitive to the direction of current flow through that coil, the transistors in turn controlling that current flow direction. This principle of operation is employed in the present battery charging circuit to connect the battery either to the main charging voltage source or to a reduced voltage charging source in accordance with the detected needs of the battery. The charging circuit is therefore a limited current charging circuit with automatic start and stop sensing.

An important feature of the charging circuit therefore is that the battery is always connected to a voltage source, either a main charging voltage source for use when the battery is discharged, or a "maintaining" voltage source for use when the battery is charged. Thus, the battery is fully protected against loss of capacity, even during periods of non-use. Moreover, the circuit is capable of adjusting to the needs of the battery at any time automatically and independently of voltage fluctuations in the primary circuit. One of the important features which permit such accuracy and selectivity is the use of a control means which is itself insensitive to signals other than the actuating signal to be used.

Figure 2:
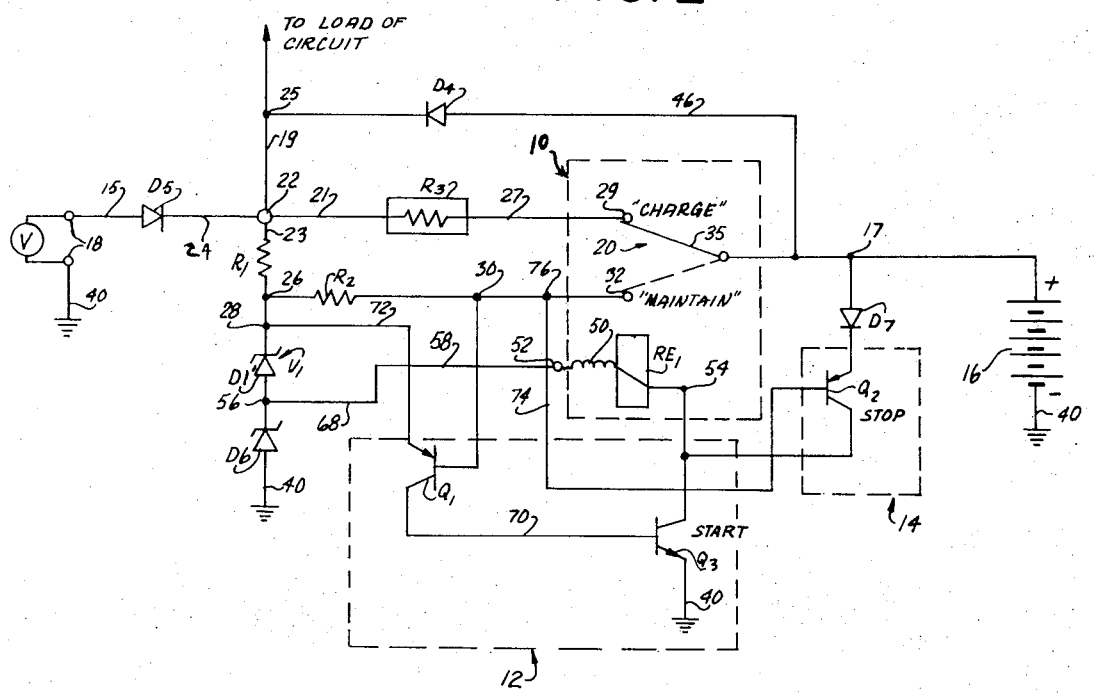

To the accomplishment of the above, and to such other objects as may hereinafter appear, the present invention is directed to a battery charging circuit as defined in the appended claims, and as illustrated in the accompanying drawings in which:

FIG. 1 is a schematic circuit diagram of one embodiment of a battery charging circuit typical of the invention; and FIG. 2 is a schematic circuit diagram of another embodiment of a battery charging circuit typical of the invention.

Generally the battery charging circuit as shown in two embodiments in FIGS. 1 and 2 comprises the control device designated generally by the numeral 10, and first and second sensing means designated respectively by the numerals 12 and 14. The battery 16 to be charged is connected at the output of the circuit i.e. point 17. In the operation of the circuit, the sensing means designated 12 detects the condition of the battery and when the charge level thereof falls below a predetermined first level, the sensing means 12 produces an actuating signal which is transmitted to the control means 10. The control means is thereby energized to connect the battery 16 to a charging voltage source V connected at terminals 18. The connection to the battery 16 is made through the switch portion 20 of the control device 10 and the terminal thereof marked "charge". This connection is maintained until the battery is charged to a predetermined second level which is detected by the sensing device 14. When that second level is reached, the sensing device 14 produces an actuating signal which is transmitted to the control device 10. The control device 10 is thereby actuated and moves the switch portion 20 to the terminal marked "maintain", thereby connecting a reduced voltage charging source $V_1$ to the battery. This reduced voltage is, in the embodiments illustrated, a constant voltage produced by the Zener diode D1.

A more specific explanation of the circuit operations will now be described in detail. Throughout the description it will be understood that the voltage source V is at a higher voltage level than the voltage source $V_1$ and that both of these sources are at a higher voltage level than the normal full charge voltage of battery 16. For illustrative purposes and to facilitate the subsequent explanation of the circuitry, source V will be assumed to be 15 volts, source $V_1$ 12.5 volts, and battery 16 at a nominal voltage level of 12 volts.

Referring to FIG. 1, the external power source V is connected to the input terminals 18 as shown. This voltage source is connected by line 15 to diode D5, and from diode D5 to the junction point 22 by line 24. The voltage is carried from the junction point 22 by lines 19, 21 and 23 to three different branches of the circuit. Line 19 carries this voltage to point 25 which is connected to a load (not shown). The line 19 can be eliminated if desired, and the charging operation of the circuit in the other two branches will be unaffected. With the line 19 in the circuit as shown, source V represents the main circuit voltage source which normally supplies the load. Therefore, when source V fails battery 16 supplies the load through line 46 and diode D4. During the normal operation of the source V, diode D4 is back-biased due to the higher potential of source V relative to the battery 16, and therefore the battery 16 is in a stand-by condition.

Line 21 connects one end of resistor R3 to the junction point 22. The other end of R3 is connected by line 27 to the "charge" terminal 29 which forms a part of the switch portion 20 of the control device 10. When the switch portion 20, that is the relay arm 35, is in the position shown in FIG. 1, the voltage of the power source V is connected to the positive terminal of the battery 16. As hereinafter further explained this connection is made when the battery 16 is to be charged after a discharge period. Resistor R3, which is a positive temperature coefficient resistor, acts as a ballast to limit the initial charging current to the battery during the charging period.

Line 23 connects the junction point 22 to one side of the resistor R1. The other side of that resistor is connected to the junction point 26. Resistor R2 is connected between the junction point 26 and a junction point 30, the latter junction point being connected to the "maintain" terminal 32 on the switch portion 20 of the control device 10. Junction point 26 between resistors R1 and R2 is connected by line 33 to another junction point 28 to which the Zener diode D1 is connected by line 37. The other end of the Zener diode D1 is connected to a common ground numerically designated 40.

The sensing means 12 and 14 are shown in FIG. 1 as PNP transistors Q1 and Q2. The emitter of Q1 is connected directly to the junction point 28, while the base of Q1 is connected to the junction point 30. The base of Q2 is also connected to the junction point 30, and its emitter is connected through diodes D2 and D3 and the line 34 to the junction point 17 to which the positive terminal of the battery 16 is also connected. The collectors of each of the transistors are connected directly to induction coils 42 and 44 through lines 43 and 45 respectively. The coils 42 and 44 are a part of the magnetic latching relay designated RE1 which comprises the control device generally designated 10.

When the voltage source V is properly functioning, it supplies a current to a load at point 25. Battery 16 is then on standby and not in use. Relay arm 35 is connected with terminal 32 (shown by broken lines) and therefore the constant voltage of D1 is connected to the battery 16. When the voltage source V fails, battery 16 supplies current to the load through line 46 and D4. This supply continues until the source V is restored to its normal operating condition. When this occurs the battery 16 is no longer used and transistor Q1 is caused to conduct. Current then flows to the induction coil 42 of the magnetic latching relay RE1. The conduction of transistor Q1 occurs because the emitter is at the potential of Zener diode D1 which, in the illustrated example, is set at 12.5 volts, and the base is at the potential of point 30 in the circuit. The voltage at point 30 is equal to the voltage output of Zener diode D1 i.e., the potential at point 26, less the IR drop through resistor R2. Current flow through R2 occurs because the relay arm 35 is connected to terminal 32, thereby completing a current flow path to the battery 16 which is now in a discharged condition. As a result of this current flow the base voltage on transistor Q1 is less than the voltage at the emitter of this transistor by an amount sufficient to cause the transistor Q1 to conduct.

The current produced by the transistor Q1 actuates the latching relay RE1 by passing through the induction coil 42. The energized coil 42 magnetically causes the transfer of latching arm 35 to position 29 as shown by the solid line. The battery 16 is then connected directly through the branch containing resistor R3 to the external power source V. The battery is thereafter charged by this source, the charging current flowing through resistor R3. The arm 35 of the relay remains in the charge position, that is, in contact with the terminal 29, independently of the subsequent non-conduction of transistor Q1 due to the open circuit at terminal 32. Because of the inherent operation of a magnetic latching relay such as RE1, relay arm 35 remains in the position to which it is moved until the other induction coil 44 is properly actuated.

When the battery 16 is sufficiently charged, the voltage at its terminals rises toward the level of source V beyond 12 volts such as to 14 volts for the example here described. At this point, transistor Q2 conducts because it is forward biased due to the difference in voltage potential between its emitter and base. The emitter voltage is substantially equal to the voltage at the positive battery terminal i.e. at junction 17, since the voltage drop through diodes D2 and D3 is negligible. The voltage at the base of transistor Q2 is the same as the voltage at the junction point 30 which is equal to the voltage of the Zener diode D1 since there is no voltage drop through R2 during that period. Thus, when the emitter of Q2 rises to 14 volts and the base is at the voltage level of the Zener diode, i.e., approximately 12.5 volts, transistor Q2 is forward biased and conducts current. This current flows directly through the induction coil 44 to ground 40. The positive flow of current through induction coil 44 again actuates the latching relay RE1, and energizes the relay arm 35 to move back to terminal 32. Since the battery 16 is now fully charged, there is no current flow to the battery through the branch containing resistors R1 and R2, and therefore the constant voltage of Zener diode D1 is applied directly to the terminals of the battery 16. This connection continues during the period of non-use of the standard battery 16, and enables this battery to maintain its charge capacity without reduction or loss thereof. The relay arm 35 will remain at terminal 32 until an actuating current again passes to induction coil 42, and this will not occur until the battery 16 is sufficiently discharged after supplying a load connected to point 25. This of course occurs when the battery is used in the primary circuit. When such a current again flows, transistor Q1 again conducts, relay arm again moves to terminal 29, and the cycle is repeated.

The circuit therefore functions not only to automatically charge the battery 16 whenever such a charge is required, but also to maintain a constant voltage across the battery terminals during the periods of non-use. The battery is therefore fully protected by the circuit against a substantial loss of capacity. Moreover, it is continuously held in a ready-to-operate condition, and therefore may be called upon for its reserve power at any time.

The magnetic latching relay RE1, which is used in the circuitry of FIG. 1, may be any of the many commercially available devices of this type. The embodiment of FIG. 1 illustrates this relay as having two separate induction coils each operating independently of the other to motivate the arm from one position to another. The embodiment of FIG. 2 illustrates the use of a latching relay having a single induction coil 50. This particular latching relay moves the latching arm 5 from terminal 32 to 29 when current passes through it in a forward direction, that is from point 52 to point 54. The latching arm 35 is moved back to terminal 32 when current is caused to pass through the induction coil 50 from point 54 to point 52, that is, in an opposite direction. The circuit of FIG. 2 therefore is arranged to provide a properly directed current at a suitable time depending upon the condition of the battery 16. To this end the circuit of FIG. 2 includes, in addition to the components specified in FIG. 1, Zener diode D6 and transistor Q3. Zener diode D6 is directly connected to ground 40 at one end and to point 56 at the other end. This Zener diode D6 maintains the point 56 at a potential about one-half of the potential of point 28 which is controlled by the Zener diode D1'. Thus, if D1' and D6 are 6.2 volts Zener diodes, point 28 is at 12.4 volts and point 56 is at 6.2 volts. Point 56, i.e. the constant voltage of diode D6, is connected by line 68 to point 52 to which one end of the induction coil 50 is also connected. The other end of the induction coil 50 is connected to point 54 to which the collectors of transistors Q2 and Q3 are also connected.

Transistor Q3 is an NPN transistor with a grounded emitter. The base of this transistor is connected directly by line 70 to the collector of transistor Q1. The emitter of transistor Q1 is connected to point 28 by line 72.

In the operation of the circuit of FIG. 2, when the switch arm 35 is in the "maintain" position, that is, in contact with terminal 32 as shown by the broken lines, the battery 16 is maintained at a constant voltage in a manner similar to that described with reference to FIG. 1. After the battery 16 is discharged and source V is restored to full operation, current flows through resistor R2 thereby reducing the voltage at the base of Q1 below the voltage at the emitter of Q1. Q1 is then caused to conduct. The conduction of Q1 turns on transistor Q3 and effectively short circuits the collector to the emitter in this transistor. Current then passes through coil 50 from the higher potential point 52, i.e. the voltage of Zener diode D6 to the lower potential point 54 which is virtually at ground through transistor Q3. Flow of current through coil 50 from point 52 to 54 causes the relay arm 35 to switch to the positions shown by the solid lines, that is in contact with terminal 29. Thereafter battery 16 is charged by the current flowing through resistor R3 from the source V at terminals 18. When the battery is fully charged, the terminal voltage at the battery approaches that of the source V and when it reaches a prescribed level which, as in the example above, was approximately 14 volts, transistor Q2 is switched on. This occurs because the emitter of Q2 is effectively at the potential of the positive battery terminal through diode D7, and the base of transistor Q2 is maintained at the potential of point 28 by its connection through line 74 to point 76. When Q2 conducts, the potential of point 54 is substantially at the same level as that of the emitter of Q2, since Q3 is no longer conductive when the circuit is opened at terminal 32. Point 54 is then at a higher potential than the point 52 which is connected directly to the 6.2 volt Zener diode D6. Therefore, current flows from point 54 to point 52 through the coil 50. This reverse current flow energizes the latching of the arm 35 to return to terminal 32. As a result, the constant voltage at point 28 is applied to the battery terminals and maintained until a discharge of the battery again occurs.

In a typical operating circuit of the battery charger the following components were utilized:

| | | |
|---|---|---|
| R1 and R2 | = | 47 ohms |
| R3 | = | 10 watts 6 volt ballast resistor |
| D1 | = | 12.5 volt Zener diode |
| D2 and D3 and D7 | = | 1N491 |
| D4 and D5 | = | 40208 |
| D1', D6 | = | 6.2 volt Zener diode |
| Q1, Q2 and Q3 | = | MPS 404 |
| RE1 | = | 200 ohm 9 volt magnetic latching reed relay, manufactured by General Reed Co. of N. J. |

From the foregoing, it will be appreciated that the battery charging circuit of the invention not only charges a battery to a full charge condition after its use, but also enables that battery to be maintained in a fully charged condition during its period of non-use. The circuit automatically senses the condition of the battery and selects a proper charging source for connection to the battery. As a result, the battery is continuously prepared for emergency use. The charging circuit performs its function with a minimum of operating components and therefore is relatively inexpensive. Moreover, the inherent "memory" and relative insensitivity of the circuit control means enables the circuit to operate with a high degree of accuracy.

Although several embodiments of the invention have been illustrated and described, it will be apparent that additional modifications of the invention may be made without departing from the scope of the invention as defined in the following claims.

I claim:

1. A battery charging circuit for automatically charging a battery and maintaining the battery in a charged condition comprising:
   a. first sensing means effective to sense when the battery is discharged below a predetermined first condition and to produce an actuating signal in response thereto,
   b. second sensing means effective to sense when the battery is charged above a predetermined second condition and to produce an actuating signal in response thereto,
   c. a main charging source,
   d. a reduced voltage charging means effective to provide a reduced voltage, the upper level of which is independent of the level of said main charging source and of the condition of said battery, and
   e. control means operatively connected to said first and second sensing means and adapted to receive the actuating signals therefrom, said control means being effective when actuated by said first sensing means to connect the battery to said main charging source and to maintain said connection thereafter until actuated by said second sensing means and effective when so actuated by said second sensing means to connect said battery to said reduced voltage charging means and to maintain said connection until actuated again by said first sensing means when said battery discharges below said predetermined first condition, said reduced voltage charging means being operatively connected to said sensing means and said control means so as to energize them.

2. In the battery charging circuit of claim 1, means for providing a reference voltage, in which said first sensing means is operatively connected to said reference voltage means and to the battery to be charged, and is effective to produce its actuating signal when the voltage difference between said reference voltage means and said battery is at a first predetermined value.

3. The battery charging circuit of claim 2, in which said second sensing means is operatively connected to said reference voltage means and to the battery to be charged, and is effective to produce its actuating signal when the voltage difference between said reference voltage means and said battery is at a second pre-determined value.

4. The battery charging circuit of claim 3, in which said control means comprises switch means effective to switch to first and second operative positions in response to the actuation signals of said first and second sensing means respectively.

5. The battery charging circuit of claim 1, in which said first and second sensing means comprise first and second semiconductor means.

6. In the battery charging circuit of claim 1, means for providing a reference voltage, in which said first sensing means is operatively connected to said reference voltage means and to the battery to be charged, and is effective to produce its actuating signal when the voltage difference between said reference voltage means and said battery is at a first predetermined value.

7. The battery charging circuit of claim 6, in which said second sensing means is operatively connected to said reference voltage means and to the battery to be charged, and is effective to produce its actuating signal when the voltage difference between said reference voltage means and said battery is at a second pre-determined value.

8. The battery charging circuit of claim 6, in which said control means comprises switch means effective to switch to first and second operative positions in response to the actuation signals of said first and second sensing means respectively.

9. The battery charging circuit of claim 8, in which said switch means comprises first and second energizing means separately connected to said first and second sensing means respectively, one of said energizing means being effective to energize said switch means to move from said first position to said second position in response to the actuating signal of said first sensing means, and the other of said energizing means being effective to energize said switch means to move from said second position to said first position in response to the actuating signal of said second sensing means.

10. The battery charging circuit of claim 8, in which said switch means further comprises energizing means effective to energize said switch means to move between said first and second positions in response to the polarity of the actuating signals of said first and second sensing means, one of said first and second sensing means being connected to one part of said energizing means and being effective to produce an actuating signal of one polarity through said energizing means, and the other of said sensing means being connected to another part of said energizing means and effective to produce an actuating signal of opposite polarity through said energizing means.

11. The battery charging circuit of claim 10, in which said first sensing means comprises first and second semiconductor means operatively connected between said reference voltage means and said energizing means, said first semiconductor means being effective to produce an actuating signal when the battery is discharged below said predetermined first condition, said second semiconductor means being actuated by said actuating signal of said first semiconductor means, and second reference voltage means operatively connected to said energizing means, said second semiconductor means when actuated being effective to enable said second reference voltage means to cause a current to flow through said energizing means in a given direction.

12. A battery charging circuit for automatically charging a battery and maintaining the battery in a charged condition comprising means for providing a reference voltage source, first sensing means operatively connected to said reference voltage means and to the battery to be charged and effective to produce an actuating signal when the voltage difference between said reference voltage means and said battery is at a first predetermined value, thereby to sense battery discharge below a predetermined first condition, second sensing means operatively connected to said reference voltage means and to the battery to be charged, and effective to produce an actuating signal when the voltage difference between said reference voltage means and said battery is at a second predetermined value, thereby to sense when the battery is charged above a predetermined second condition, a main charging source, a reduced voltage charging means effective to provide a reduced voltage, the upper level of which is independent of the level of said main charging source and of the condition of said battery, and control means operatively connected to said first and second sensing means and adapted to receive the actuating signals therefrom, said control means being effective when actuated by said first sensing means to connect the battery to said main charging source and to maintain said connection thereafter until actuated by said second sensing means and effective when so actuated by said second sensing means to connect said battery to said reduced voltage charging means and to maintain said connection until actuated again by said first sensing means when said battery discharges below said predetermined first condition, said control means comprising switch means effective to switch to first and second operative positions in response to the actuation signals of said first and second sensing means, respectively, said switch means comprising first and second energizing means separately connected to said first and second sensing means, respectively, one of said energizing means being effective to energize said switch means to move from said first position to said second position in response to the actuating signal of said first sensing means, and the other of said energizing means being effective to energize said switch means to move from said second position to said first position in response to the actuating signal of said second sensing means.

13. A battery charging circuit for automatically charging a battery and maintaining the battery in a charged condition comprising means for providing a reference voltage source, first sensing means operatively connected to said reference voltage means and to the battery to be charged and effective to produce an actuating signal when the voltage difference between said reference voltage means and said battery is at a first predetermined value thereby to sense battery discharge below a predetermined first condition, second sensing means operatively connected to said reference voltage means and to the battery to be charged, and effective to produce an actuating signal when the voltage difference between said reference voltage means and said battery is at a second predetermined value thereby to sense when the battery is charged above a predetermined second condition, a main charging source, a reduced voltage charging means effective to provide a reduced voltage, the upper level of which is independent of the level of said main charging source and of the condition of said battery, and control means operatively connected to said first and second sensing means and adapted to receive the actuating signals therefrom, said control means being effective when actuated by said first sensing means to connect the battery to said main charging source and to maintain said connection thereafter until actuated by said second sensing means and effective when so actuated by said second sensing means to connect said battery to said reduced voltage charging means and to maintain said connection until actuated again by said first sensing means when said battery discharges below said predetermined first condition, said control means comprising switch means effective to switch to first and second operative positions in response to the actuation signals of said first and second sensing means, respectively, energizing means effective to energize said switch means to move between said first said reduced voltage charging means and to maintain said connection until actuated again by said first sensing means when said battery discharges below said predetermined first condition, said reduced voltage charging means being operatively connected to said sensing means and said control means so as to energize them.

14. The battery charging circuit of claim 13, in which said first sensing means comprises first and second semiconductor means operatively connected between said reference voltage means and said energizing means, said first semiconductor means being effective to produce an actuating signal when the battery is discharged below said predetermined first condition, said second semiconductor means being actuated by said actuating signal of said first semiconductor means, and second reference voltage means operatively connected to said energizing means, said second semiconductor means when actuated being effective to enable said second reference voltage means to cause a current to flow through said energizing means in a given direction.

* * * * *